(12) United States Patent
Chang

(10) Patent No.: US 8,026,692 B2
(45) Date of Patent: Sep. 27, 2011

(54) PORTABLE ELECTRONIC DEVICE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 506 days.

(21) Appl. No.: 12/276,571

(22) Filed: Nov. 24, 2008

(65) Prior Publication Data

US 2009/0261776 A1    Oct. 22, 2009

(30) Foreign Application Priority Data

Apr. 16, 2008    (CN) .......................... 2008 1 0301157

(51) Int. Cl.
*H01M 10/46*    (2006.01)

(52) U.S. Cl. ....................................... 320/101; 320/104
(58) Field of Classification Search .................. 320/101, 320/104
See application file for complete search history.

(56) References Cited

U.S. PATENT DOCUMENTS

2008/0272733 A1* 11/2008 Huang .......................... 320/102
* cited by examiner

*Primary Examiner* — Bot Ledynh
(74) *Attorney, Agent, or Firm* — Altis Law Group, Inc.

(57) ABSTRACT

An exemplary portable electronic device includes a main body and a battery therein. The main body has a wind power generating and charging module mounted therein. The wind power generating and charging module includes a wind turbine generator and a control circuit. The control circuit is configured for controlling the wind generator to charge the battery.

16 Claims, 4 Drawing Sheets

PORTABLE ELECTRONIC DEVICE

BACKGROUND

1. Technical Field

The present invention relates to portable electronic devices, and particularly, to a portable electronic device with a wind power generating and charging module.

2. Discussion of Related Art

Portable electronic devices such as mobile phones and personal digital assistants (PDAs) are now in widespread use, and consumers can enjoy great convenience provided by such multi-functional devices. Usually the portable electronic devices need battery to provide electric power.

Currently, in the trends of promoting environmental protection and energy conservation, the use of solar or wind power for electricity generation has become increasingly popular. Although, there is portable electronic device with wind generating module, but, when there is no wind, the wind generating module is useless.

Therefore, what is needed is a portable electronic device capable of overcoming the described limitations.

SUMMARY

An exemplary portable electronic device includes a main body and a battery therein. The main body has a wind power generating and charging module mounted therein. The wind power generating and charging module includes a wind turbine generator and a control circuit. The control circuit is configured for controlling the wind generator to charge the battery.

BRIEF DESCRIPTION OF THE DRAWINGS

Many aspects of the present portable electronic device can be better understood with reference to the following drawings. The components in the drawings are not necessarily to scale, the emphasis instead being placed upon clearly illustrating the principles of the present portable electronic device. Moreover, in the drawings, like reference numerals designate corresponding parts throughout the several views.

DETAILED DESCRIPTION OF EMBODIMENTS

Reference will now be made to the drawings to describe in detail of the exemplary embodiment of the portable electronic device.

Figure 1:
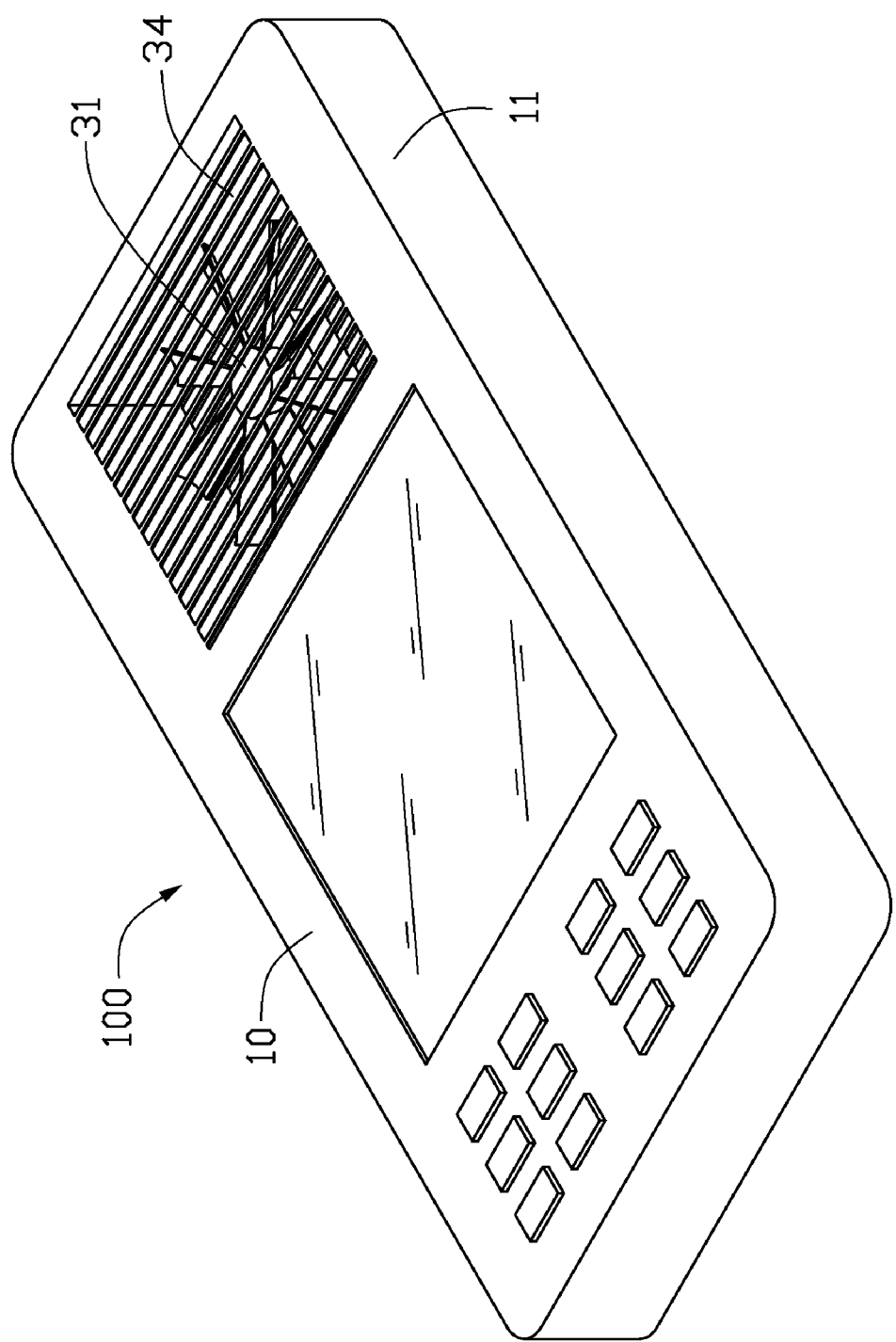
FIG. 1 is a schematic, isometric view of a portable electronic device in accordance with an exemplary embodiment.
Figure 2:
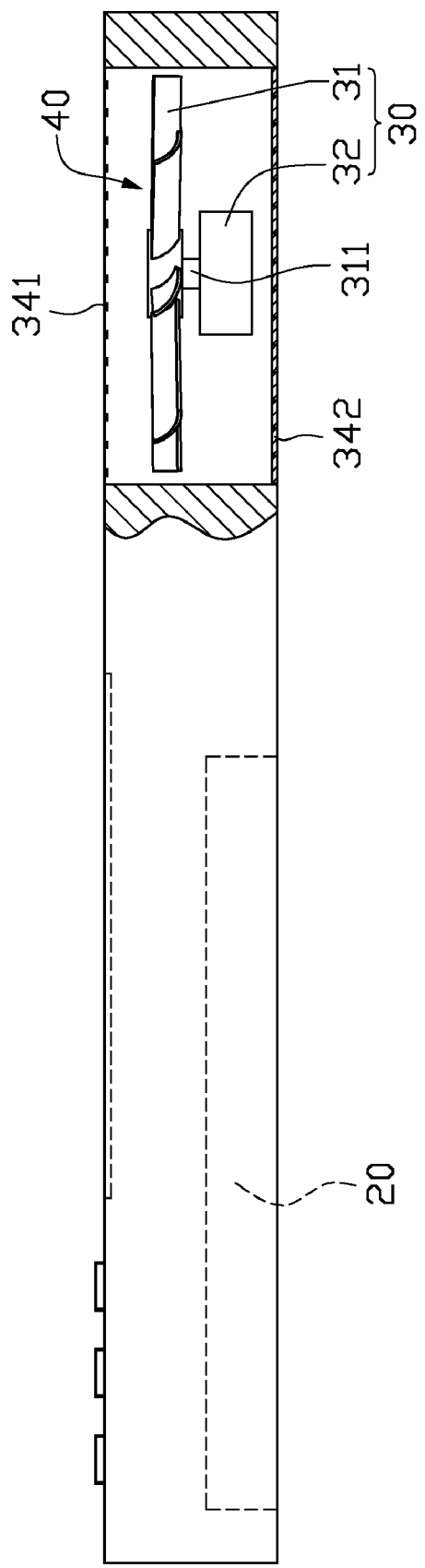
FIG. 2 is a partially cut-away view of the portable electronic device of FIG. 1.

Referring to FIGS. 1 and 2, a portable electronic device 100, here a mobile phone as an example, in accordance with an exemplary embodiment, includes a main body 10 and a battery 20 mounted in the main body 10.

A wind power generating and charging module 40 is mounted in the main body 10 and configured for generating and charging the battery 20. In the present embodiment, the wind power generating and charging module 40 is located at an end 11 of the main body 10.

Figure 4:
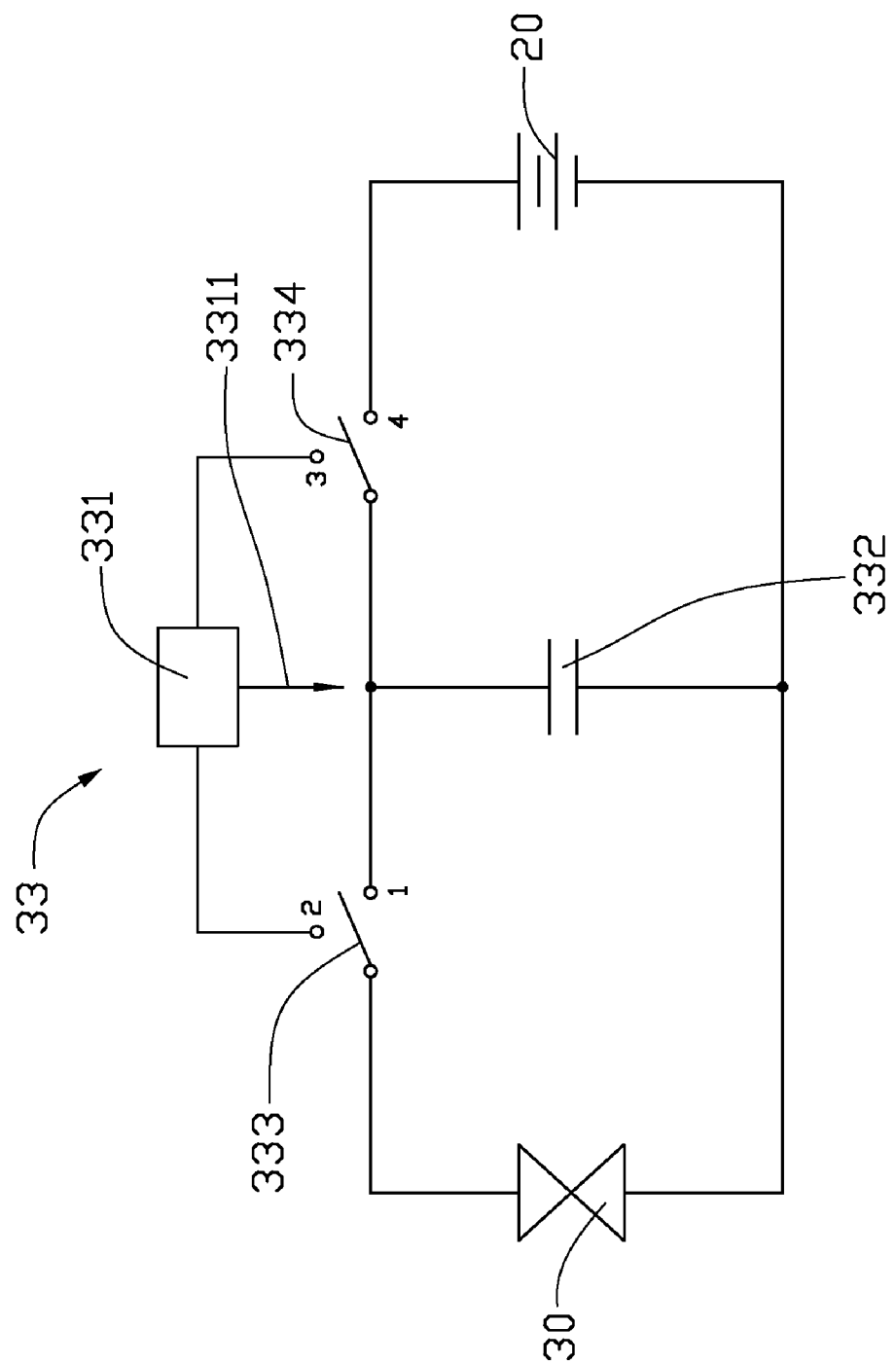
FIG. 4 illustrates a control circuit of the wind power generating and charging module of the portable electronic device of FIG. 1, in accordance with an exemplary embodiment.

The wind power generating and charging module 40 includes a wind turbine generator 30 and a control circuit 33 (see FIG. 4). The control circuit 33 is configured for controlling the wind generator 30 to charge the battery 20.

Referring to FIG. 2, the wind turbine generator 30 includes a fan 31, a transmission shaft 311 and a generator 32. The transmission shaft 311 is configured for connecting the fan 31 to the generator 32.

Referring to FIG. 4, the control circuit 33 includes a digital signal processing chip 331, an energy storage device 332, a first switch 333 and a second switch 334. The first switch 333 and the wind turbine generator 30 are connected in series. The second switch 334 and the battery 20 are connected in series. The wind turbine generator 30, the battery 20 and the energy storage device 332 are connected in parallel.

The digital signal processing chip 331 includes a voltage sensing module 3311. The voltage sensing module 3311 is configured for sensing a voltage generated by the wind turbine generator 30. Depending on the output of the voltage, the digital signal processing chip 331 controls the first switch 333 and the second switch 334 to connect or disconnect. The connection or disconnection of the first switch 333 and the second switch 334 cause the wind power generating and charging module 40 to work at a normal charge mode, an energy storage mode or an emergency charge mode.

When the voltage sensing module 3311 senses the voltage of the wind turbine generator 30 being high, the first switch 333 connects with a contact point 1, the second switch 334 connects with a contact point 3, and then the wind turbine generator 30 and the battery 20 form a loop. In this stage, the wind power generating and charging module 40 works at a normal charge mode and charges the battery 20. So, when the wind is strong, the battery 20 can be charged by the wind turbine generator 30 directly.

When the voltage sensing module 3311 senses the voltage of the wind turbine generator 30 being low, the first switch 333 connects with a contact point 2, the second switch 334 connects with a contact point 4, and then the wind turbine generator 30 and the energy storage device 332 form a loop. In this stage, the wind power generating and charging module 40 works at an energy storage mode. Energy is stored at the energy storage device 332. Therefore, when the wind is weak, the energy produced by the wind turbine generator 30 can be stored in the energy storage device 332 for backup.

When the voltage sensing module 3311 senses the voltage of the wind turbine generator 30 being none, the second switch 334 connects with the contact point 4, and then the energy storage device 332 and the battery 20 form a loop. In this stage, the wind power generating and charging module 40 works at an emergency charge mode and the energy storage device 332 charges the battery 20. So, when no wind exists, the battery 20 can be charged by the energy storage device 332 directly.

With the embodiments of the present invention as described here, the battery 20 of the portable electronic device 100 can be charged whenever needed.

Figure 3:
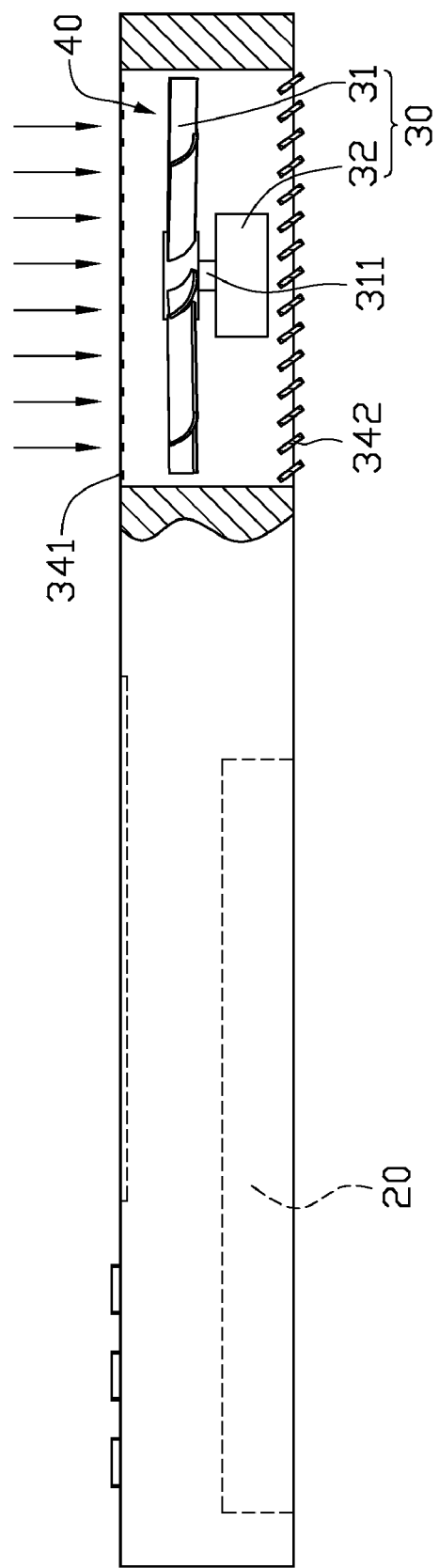
FIG. 3 is a partially cut-away view of the portable electronic device of FIG. 1 when the wind power generating and charging module being in use.

The wind turbine generator 30 is covered by a protective cover 34 (see FIG. 1). The protective cover 34 and the main body 10 are integrated. The protective cover 34 includes a front cover 341 and a back cover 342. The front cover 341 can be grid shaped or network structure. The back cover 342 is foldable louver structure that can be opened or closed. The back cover 342 can be controlled/driven by a driving device (not shown) to open or close. When the wind power generating and charging module 30 is in use, the driving device can drive the back cover 342 open (see FIG. 3). Under this condition, the wind can go through the back cover 342 easily and drive the fan 31 to rotate. When the wind power generating and charging module 30 is not in use, the driving device can drive the back cover 342 to close (see FIG. 2). Under this condition, the wind power generating and charging module 30 can be protected by the back cover 342 to prevent from being damaged. The driving device can control the blade of the foldable louver open at certain angle allowing the blade to be at an optimal position according to the wind direction. Certainly, the front cover 341 may have the same function as the back cover 342.

It is understood that the portable electronic device 100 may also be a digital camera, a personal digital assistant (PDA), etc.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A portable electronic device, comprising:
a main body;
a battery mounted in the main body; and
a wind power generating and charging module mounted in the main body, the wind power generating and charging module comprising a wind turbine generator and a control circuit, wherein the control circuit is configured for controlling the wind generator to charge the battery, the control circuit comprises a digital signal processing chip, an energy storage device, a first switch, and a second switch; the first switch and the wind turbine generator are connected in series; the second switch and the battery are connected in series; the wind turbine generator, the battery and the energy storage device are connected in parallel.

2. The portable electronic device of claim 1, wherein the wind turbine generator comprises a fan, a transmission shaft and a generator, the fan being connected to the generator by the transmission shaft.

3. The portable electronic device of claim 1, wherein the digital signal processing chip comprises a voltage sensing module configured for sensing a voltage generated by the wind turbine generator and controlling the first switch and the second switch to connect or disconnect to make the wind power generating and charging module separately work at a normal charge mode, an energy storage mode or an emergency charge mode.

4. The portable electronic device of claim 3, wherein when the voltage sensing module senses that the voltage of the wind turbine generator is high, and the portable electronic device is put in the normal charge module by the first and the second switches, then the wind turbine generator and the battery form a loop, the wind power generating and charging module works at normal charge mode, the wind turbine generator charges the battery.

5. The portable electronic device of claim 3, wherein when the voltage sensing module senses that the voltage of the wind turbine generator is low, and the portable electronic device is put in the energy storage module by the first switch, then the wind turbine generator and the energy storage device form a loop, the wind power generating and charging module works at energy storage mode, the wind turbine generator stores up the energy storage device.

6. The portable electronic device of claim 3, wherein when the voltage sensing module senses that the voltage of the wind turbine generator is none, and the portable electronic device is put in the emergency charge module by the second switch, then the energy storage device and the battery form a loop, the wind power generating and charging module works at emergency charge mode, the energy storage device charges the battery.

7. The portable electronic device of claim 1, wherein the wind turbine generator is covered by a protective cover, and the protective cover and the main body are integrated.

8. The portable electronic device of claim 7, wherein the protective cover comprises a front cover and a back cover, the front cover is grid shaped or network structure, the back cover is foldable louver structure which can be opened or closed.

9. The portable electronic device of claim 1, wherein the wind power generating and charging module locates at an end of the main body.

10. A portable electronic device, comprising:
a main body;
a display screen mounted in the main body;
a keyboard located at one side of the display screen;
a battery mounted in the main body; and
a wind power generating and charging module mounted in the main body at an opposite side of the display screen, the wind power generating and charging module comprising a wind turbine generator and a control circuit, wherein the control circuit is configured for controlling the wind generator to charge the battery, the control circuit comprises a digital signal processing chip, an energy storage device, a first switch, and a second switch; the first switch and the wind turbine generator are connected in series; the second switch and the battery are connected in series; the wind turbine generator, the battery and the energy storage device are connected in parallel.

11. The portable electronic device of claim 10, wherein the digital signal processing chip comprises a voltage sensing module configured for sensing a voltage generated by the wind turbine generator and controlling the first switch and the second switch to connect or disconnect to make the wind power generating and charging module separately work at a normal charge mode, an energy storage mode or an emergency charge mode.

12. The portable electronic device of claim 11, wherein when the voltage sensing module senses that the voltage of the wind turbine generator is high, and the portable electronic device is put in the normal charge module by the first and the second switches, then the wind turbine generator and the battery form a loop, the wind power generating and charging module works at normal charge mode, the wind turbine generator charges the battery.

13. The portable electronic device of claim 11, wherein when the voltage sensing module senses that the voltage of the wind turbine generator is low, and the portable electronic device is put in the energy storage module by the first switch, then the wind turbine generator and the energy storage device form a loop, the wind power generating and charging module works at energy storage mode, the wind turbine generator stores up the energy storage device.

14. The portable electronic device of claim 11, wherein when the voltage sensing module senses that the voltage of the wind turbine generator is none, and the portable electronic device is put in the emergency charge module by the second switch, then the energy storage device and the battery form a loop, the wind power generating and charging module works at emergency charge mode, the energy storage device charges the battery.

15. The portable electronic device of claim 10, wherein the wind turbine generator is covered by a protective cover, and the protective cover and the main body are integrated.

16. The portable electronic device of claim 15, wherein the protective cover comprises a front cover and a back cover, the front cover is grid shaped or network structure, the back cover is foldable louver structure which can be opened or closed.

* * * * *